United States Patent [19]

Grandjean

[11] 3,725,382
[45] Apr. 3, 1973

[54] DIFLUOROPYRIMIDYLAMINO-GROUP-CONTAINING METALLIZED WATER-SOLUBLE REACTIVE FORMAZANE DYES

[75] Inventor: Philippe Grandjean, Basel, Switzerland

[73] Assignee: Sandoz Ltd., Basel, Switzerland

[22] Filed: Mar. 26, 1970

[21] Appl. No.: 23,024

[30] Foreign Application Priority Data

Mar. 26, 1969 Switzerland....................4656/69
Apr. 1, 1969 Switzerland...........................4927/69

[52] U.S. Cl. ......................260/146 D, 8/10, 8/42 R, 260/149, 260/154, 260/193
[51] Int. Cl. ......C09b 45/18, C09b 62/24, D06p 1/38
[58] Field of Search .......260/146 D, 146 T, 153, 154

[56] References Cited

UNITED STATES PATENTS

| | | | |
|---|---|---|---|
| 3,041,328 | 6/1962 | Kraus et al........................260/146 D |
| 3,068,219 | 12/1962 | Beffa et al. .......................260/146 D |
| 3,244,690 | 4/1966 | Steinemann......................260/146 D |
| 3,202,649 | 8/1965 | Steinemann......................260/146 D |
| 3,202,650 | 8/1965 | Steinemann......................260/146 D |

FOREIGN PATENTS OR APPLICATIONS 1,330,585   5/1963   France ..............................260/153

*Primary Examiner*—Floyd D. Higel
*Attorney*—Gerald D. Sharkin, Thomas C. Doyle, Robert S. Honor, Walter F. Jewell, Thomas O. McGovern, Richard C. Vila and Frederick H. Weinfeldt

[57] ABSTRACT

Metal complexes of reactive water-soluble formazane dyes which contain 2, 3 or 4 sulfonic acid groups and one difluoropyrimidylamino group yield dyeings which have good fastness to light, washing, milling and perspiration.

5 Claims, No Drawings

DIFLUOROPYRIMIDYLAMINO-GROUP-CONTAINING METALLIZED WATER-SOLUBLE REACTIVE FORMAZANE DYES

This invention relates to a process for the production of reactive, water-soluble metal complex compounds which, in the metal-free state, have the formula

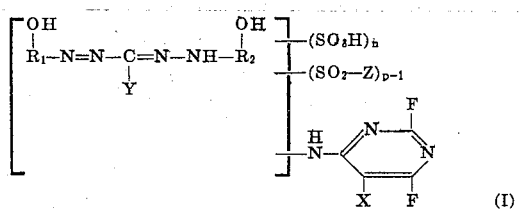

where X stands for a hydrogen, chlorine, bromine or fluorine atom or for a lower alkyl group which may be substituted, Y for hydrogen or a group

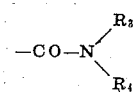

Z for a lower alkyl group which may be substituted or an amino group which may be monosubstituted,
$n$ for 2, 3 or 4,
$p$ for 1, 2 or 3,
where the sum of n and p is 3, 4 or 5,
$R_1$ and $R_2$ each stands for a benzene or naphthalene radical which bears the OH group in ortho position to —N= or —NH— and may be substituted,
$R_3$ for a hydrogen atom or for an aliphatic radical which may be substituted,
$R_4$ for an aliphatic or cycloaliphatic radical which may be substituted or for a benzene or naphthalene radical which may be substituted,
or $R_3$ and $R_4$, jointly with the adjacent N atom, form a heterocyclic ring. Copper complex compounds which, in the copper-free state, conform to the general formula (I),
where X stands for chlorine,
$n$ for 2 or 3,
$p$ for 1
and $R_1$ and $R_2$ for benzene or toluene radicals which bear the OH group in ortho position to —N= or —NH—, are dyes of notably good quality.

The process of this invention consists of reacting 1 mole of metal complex of a compound of the formula

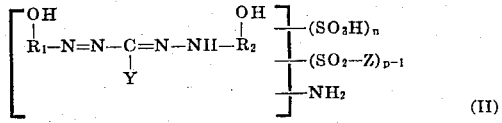

with 1 mole of a polyfluoropyrimidine of the formula

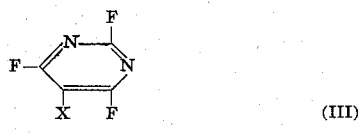

The metal complexes of the compounds of formula (I) may contain, for example, cobalt, chromium or, preferably, nickel, or more especially copper.

The metal complexes of the compounds of formula (II) which are used as starting materials in the process can be produced by the methods described in French Pat. 1,330,585 and British Pat. 1,022,043.

The lower, optionally substituted, alkyl or alkoxy groups may be, e.g., alkyl or alkoxy groups having one to five carbon atoms. They may be straight or branched and may bear substituents, such as hydroxyl or lower alkoxy groups ($-OCH_3, -OC_2H_5$).

If the radical Z represents a monosubstituted amino group, the substituent at the amino group is a lower alkyl radical which may bear substituents, such as hydroxyl and lower alkoxy groups, or the phenyl radical which may bear carboxylic or sulfonic acid groups. Suitable groups of formula $-SO_2-Z$ are, for example, lower alkylsulfonyl groups ($-SO_2CH_3, -SO_2C_2H_5, -SO_2CH(CH_3)_2$) and sulfonamide groups which may be monosubstituted, such as $-SO_2NH_2, -SO_2NHCH_3, -SO_2NHC_2H_4OCH_3, -SO_2NHC_2H_4OCH_5, -SO_2NHC_6H_5$,

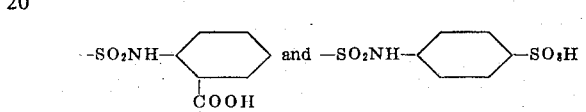

The radicals $R_1$ and $R_2$, and likewise the radical $R_4$ if it is aromatic, may bear substituents, such as lower alkyl groups (methyl, ethyl), lower alkoxy groups (methoxy, ethoxy), halogen atoms (chlorine, bromine, fluorine), the nitro group, the carboxyl group and acylamino groups, such as lower alkyl carbonylamino, lower alkoxy carbonylamino, aryl carbonylamino groups (acetylamino, propionylamino, butyrylamino, methoxycarbonylamino, ethoxycarbonylamino, benzoylamino).

If the radical $R_3$ represents optionally substituted alkyl or alkylene radicals, it may contain one to 10 carbon atoms, may be straight or branched and may bear substitutents, such as hydroxy, lower alkoxy, carboxy or phenyl groups.

If the radical $R_4$ represents optionally substituted alkyl, alkenyl or cycloalkyl radicals with five to 12 members in the carbocyclic ring, it may bear substituents, such as hydroxy, lower alkoxy, carboxy, cyclohexyl, phenyl or sulfonic acid groups or 5-membered heterocyclic radicals with O or N— hetero atoms. The preferred cycloaliphatic radicals are the cyclohexyl radical and its derivatives having lower alkyl groups (methyl, ethyl).

If the radical $R_4$ represents optionally substituted phenyl or naphthyl radicals, it may bear substituents, such as hydroxy, lower alkoxy, carboxy, sulfonic acid, amidosulfonyl, anilidosulfonyl, trifluoromethyl groups or halogen.

If the radicals $R_3$ and $R_4$, jointly with the adjacent N atom, form a heterocyclic ring, the latter is a five, six or seven-member ring which may be substituted by lower alkyl or carboxy groups and which contains one N or one N and one O hetero atom.

In the radical

denoted Y, examples of groups of formula

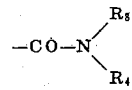

which are of special interest are methyl-, ethyl-, n-propyl-, isopropyl-, n-butyl-, isobutyl-, tert.butyl-, N-amyl-, isoamyl-, n-hexyl, n-heptyl-, n-octyl- and 2-ethylhexylamino groups; the dimethyl-, diethyl-, diisopropyl-, di-n-propyl- and di-n-butylamino groups; the allylamino group, the 2-hydroxyethyl-, 2-hydroxypropyl-, 3-hydroxypropyl-, 1-hydroxybutyl-2-, 1-hydroxy-2-methylpropyl-2-amino groups; the bis-(2-hydroxyethyl)-, bis-(2-hydroxypropyl)-amino groups; the N-methyl-N-2-hydroxyethyl-, N-ethyl-N-2-hydroxyethyl- and, N-n-propyl-N-2-hydroxyethylamino groups; the 2-methoxyethyl-, 2-ethoxyethyl-, 3-methoxypropyl-, 3-ethoxypropyl-, 3-isopropoxypropyl-, 3-n-butoxypropyl- and, 4-methoxybutylamino groups; the bis-(2-ethoxyethyl)-amino, carboxymethylamino, N-methyl-N-carboxymethylamino, 2-carboxyethylamino, benzylamino, furfurylamino, N-methyl-N-benzylamino, cyclohexylamino, 4-methylcyclohexylamino, N-methyl-N-cyclohexylamino and, N-ethyl-N-cyclohexylamino groups; the phenylamino, 2-, 3- or 4-methylphenylamino, 2,4-, 2,5- or 2,6-dimethylphenylamino, 2,4,6-trimethylphenylamino, 2-, 3- or 4-chlorophenylamino-, 2- or 4-methoxy- or -ethoxyphenylamino, 3- or 4-aminosulphonylphenylamino, 2- or 4-carboxyphenylamino and, 4-hydroxy-3-carboxyphenylamino groups; the N-methyl-, N-ethyl-, N-isopropyl-, N-n-propyl- or N-n-butyl-N-phenylamino, N-ethyl-N-4-methylphenylamino, N-methyl-N-2-carboxyphenylamino, N-2-hydroxyethyl-N-phenylamino and, N-2-hydroxyethyl-N-3-methylphenylamino groups; the morpholino, piperidino, pyrrolidino or hexamethylenimino groups; the 1-naphthylamino and 2-naphthylamino groups.

The $-SO_3H$ groups, the $-SO_2-Z-$ groups when present and also the reactive radical

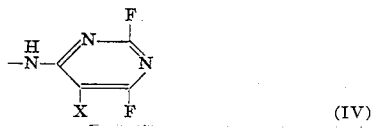

(IV)

may be bound to the radicals $R_1$ and $R_2$ and to the radical $R_4$ when the latter is aromatic. $R_1$ and $R_2$ may each contain not more than two of the aforenamed groups, but $R_4$ may bear 1, 2 or even 3 of such groups, for example :

2 $-SO_3H-$ groups on $R_1$ and 1 reactive radical on $R_2$, or 1 $-SO_3Z$ group on $R_1$, 2 $-SO_3H$ groups on $R_4$ and 1 reactive radical on $R_2$, or 1 $-SO_3H$ group on $R_1$, one $-SO_3Z$ group on $R_4$, 1 $-SO_3H$ group and 1 reactive radical on $R_2$ or 1 $-SO_3H$ group on $R_1$, one $-SO_3H$ group on $R_2$ and 1 reactive radical on $R_4$ or 1 -$SO_3H$ group on each of $R_1$, $R_2$ and $R_4$ and 1 reactive radical on $R_1$ or 1 reactive radical and 1 -$SO_3H$ group on $R_1$ and 2 -$SO_3H$ groups on $R_2$, etc.

The reaction of the water-soluble dyes used as starting products with a compound of formula (III) is carried out preferably in aqueous medium. It may, however, be effected in an organic solvent or in a mixture of organic solvent and water, which can be of special advantage if the intermediate is poorly soluble or insoluble in water.

Suitable organic solvents for this purpose include alcohols, acetone, benzene, toluene and tertiary organic bases such as pyridine. The compound of formula (III) can be employed as it is in concentrated form or in solution in an organic solvent. Highly suitable organic solvents are acetone, benzene, chlorobenzene and toluene.

The reaction temperature is adjusted to the reactivity of the starting products and varies from 0° to 30° C, the preferred temperature range being 10°–30° C.

The reaction is conducted in the neutral to weakly acid pH region of, e.g., pH seven to four. For neutralization of the equivalent of hydrogen fluoride which is formed, a buffer mixture, e.g., an acetate-acetic acid mixture, is added to the solution at the commencement of the reaction, or an acid-binding agent is added in solid, pulverized form or in aqueous solution in the course of the reaction, suitable agents being sodium or potassium carbonate, sodium and potassium hydroxide, calcium and barium hydroxide. The addition of small amounts of a wetting or emulsifying agent accelerates the reaction rate.

The reaction is controlled so that only one fluorine atom of the compound of formula (III) reacts with an exchangeable hydrogen atom.

On completion of the condensation of coupling reaction the reaction solution or suspension may, if desired, be neutralized, after which the metal complex dye formed is precipitated with sodium or potassium chloride or acid, filtered off with suction, washed and dried under controlled condition.

As the new metal complex dues are highly reactive, it is advisable to add to them, either before or after drying, a buffer salt or a mixture of buffer salts which will maintain the pH value in the vicinity of the neutral point, e.g., in the pH region of five to seven, and so enhance their stability in storage as dry powders and in padding liquors or printing pastes prior to application.

The water-soluble dyes of this invention which bear a radical of the formula (IV) are suitable for the exhaustion dyeing, pad dyeing and printing of animal and vegetable fibers, regenerated cellulosic fibers, casein fibers, animalized cellulosic fibers, synthetic polyamide fibers, blends of the aforenamed fibers and leather. The dyeings, which, if necessary, may be submitted to an alkaline aftertreatment with heating followed by soaping have good fastness to light, washing, milling and perspiration. The dyes are applicable by continuous and semi-continuous methods, such as the pad-jig, pad-roll, pad-steam and thermofixation processes.

These new reactive dyes have good solubility in water, show good compatibility with salts and hard water and good reactivity with animal, vegetable and synthetic polyamide fibers. They reserve acetate, triacetate, polyester, polyacrylonitrile, polyvinyl chloride, polyvinyl acetate and polyalkylene fibers. Owing to their good solubility in water, the unfixed proportion of the applied dye can be easily removed by washing from the dyed or printed goods.

The reactive dyes of this invention which bear only two sulphonic acid groups are well suitable for the exhaustion dyeing of cellulosic fibers and for the acid dyeing of wool, silk and synthetic polyamide fibers.

The dyeings and prints obtained with these dyes are of particularly high quality because the dyes form a stable chemical linkage with the fiber molecule, which normally imparts outstandingly food fastness to wet treatments. If the entire amount of applied dye does not react with the fiber, the unreacted amount can be cleared from the substrate by washing off and, if necessary, soaping, with heating to high temperatures as required. For this purpose synthetic detergents can be used, e.g., alkylaryl sulphonates (dodecylbenzene sulphonate), sodium lauryl, cetyl or oleylsulphate, sodium laurylpolyglycolether sulphates, monoalkyl- and dialkyl-phenylpolyglycol ethers, if desired in conjunction with sodium polyphosphate.

The dyed, padded or printed dyes are fixed on the fiber in the dyebath or in a fresh medium, if required after intermediate drying. If a fresh bath is used, it is advisable to fix in the presence of a water-soluble salt, e.g. sodium sulphate, to prevent partial re-dissolving of the dye in the medium. Fixation of the dye radical on the fiber can be effected with heating, e.g., in steam or in dry heat as in the thermofixation process, or alternatively by storage at room temperature or at moderately high temperatures.

The optimum conditions of application for the dyes vary widely with the nature of the fiber. In exhaustion dyeing, padding and printing processes they are applied to animal and synthetic polyamide fibers preferably from an acid, neutral or weakly alkaline medium, e.g., in the presence of acetic, formic, sulphuric or oxalic acid, ammonium sulphate, sodium acetate, sodium bicarbonate, sodium or potassium carbonate, sodium metaphosphate, trimethylamine, pyridine, quinoline, etc. Dyeing can be carried out in an acetic acid to neutral bath in the presence of levelling agents, e.g., polyoxethylated fatty amines, or mixtures of these and alkylphenyl or alkylpolyglycolethers, and the bath adjusted to a neutral or weakly alkaline reaction at the end of dyeing by the addition of small amounts of an agent of alkaline reaction, e.g., ammonia, sodium carbonate or bicarbonate, or a compound which reacts alkaline on heating, e.g., hexamethylene tetramine. Subsequently the goods are well rinsed and if necessary acidified with acetic acid.

The exhaustion or pad dyeing and the printing of cellulosic fibers with the new dyes is best carried out in alkaline medium, e.g., in the presence of sodium carbonate or bicarbonate, caustic soda or caustic potash solution, calcium hydroxide, sodium metasilicate, sodium borate, water glass, trisodium phosphate, ammonia, trimethylamine, quaternary bases, e.g., tetra-alkylammonium compounds. To prevent reductive reactions in dyeing, padding or printing, it is often of advantage to add a mild oxidizing agent, such as sodium 1-nitrobenzene-3-sulphonate. Fixation on cellulosic as on other fibers can be accomplished with heating. However, given the use of moderately strong alkalis, such as sodium or potassium carbonate, the dyes can be applied in the cold, with fixation in a saturated sodium chloride or sulphate solution containing sodium carbonate, or by storage at room temperature. Fixation is followed by thorough rinsing and soaping to remove the unfixed proportion of dye. Stronger alkalis, such as sodium hydroxide and trisodium phosphate, can of course be used but, as they increase the reactivity with the fiber, there is a greater danger of hydrolysis for the proportion of dye not reacted with the substrate.

In comparison with the next comparable dye of French Pat. 1,330,585 and British Pat. 1,022,043 the dyes produced in accordance with the present invention exhibit a higher degree of reactivity.

In the following Examples the parts and percentages are by weight and the temperatures are expressed in degrees centigrade.

Example 1

85.8 Parts of the copper complex compound of 1-(2'-hydroxy-4'-sulpho-6'-aminonaphthyl)-5-(2''-hydroxy-5''-sulphophenyl)-3-for-mazyl-carboxylic acid-(6'''-sulphonaphthyl-1'''-amide) in the form of the trisodium salt are dissolved in 550 parts of water. The solution is adjusted to pH 5.0 with 30 percent acetic acid and clarified by filtration, on which it is run into a reaction vessel fitted with a reflux condenser. 32 Parts of crystallized sodium acetate are added, followed by sodium carbonate to bring the pH to 6.0. Eighteen Parts of 2,4,6-trifluoro-5-chloropyrimidine are added within 2 hours at 10°-20° with stirring and with the controlled addition of dilute sodium carbonate solution to maintain the pH value in the range of 6.0 to 6.5. Subsequently stirring is continued at 10°-20° until no further free amino groups are indicated. The reactive dye formed is then salted out with sodium chloride, filtered off, washed with aqueous sodium chloride solution and carefully dried with vacuum. On grinding it is obtained as a dark powder which dissolves in water to give green-blue solutions. This new dye is the copper complex of the formazane of the formula

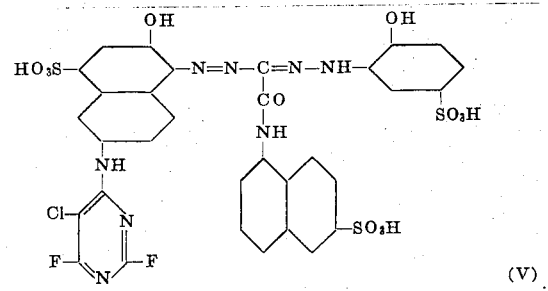

(V)

or, more exactly, a tautomeric form of this formazane. The aminoformazane dye employed in this reaction can be prepared by coupling diazotized 1-amino-2-hydroxy-6-nitronaphthalene-4-sulphonic acid with the hydrazone of glyoxylic acid-(6-sulpho)-naphthylamide and 2-hydroxy-1-hydrazinobenzene-5-sulphonic acid in the presence of a copper-yielding agent to yield the copper complex compound of 1-(2'-hydroxy-4'-sulpho-6'-nitronaphthyl)-5-(2''-hydroxy-5''-sulphophenyl)-3-formazylcarboxylic acid-6'''-sulphonaphthyl-1'''-amide) in the form of the trisodium salt. 88.8 Parts of this salt are dissolved in 500 parts of water at 65°, 17 parts of anhydrous sodium sulphide are added and the solution is stirred at 65° until reduction is complete. The aminoformazane dye can be salted out and isolated, or alternatively employed in the dissolved form.

Example of Application in Pad Dyeing

A mercerized, bleached cotton fabric is padded with a liquor containing 2 percent of the dye of Example 1, 1 percent sodium sulphate and 0.3 percent sodium carbonate, expressed to retain 70 percent of its weight of the liquid, rolled up and the roll lapped in plastic sheet to exclude air and so prevent partial drying at the edges. The dye solution and the solution of sodium carbonate and sodium sulphate are prepared separately and blended immediately before padding, preferably by means of an automatic mixing device. The roll of fabric is stored for 6 hours at 20°–30°, and afterwards is rinsed with cold and hot water, soaped for 20 minutes at the boil with a solution of 2 parts of a non-ionic detergent in 1,000 parts of water, rinsed again and dried. A green-blue dyeing is obtained which is fast to washing and water.

The nickel-containing reactive formazane dye produced in an analogous manner, on application to cotton fabric by padding, gives a dyeing of comparable fastness but with a slightly less greenish shade.

Example of Application in Printing

A cotton sateen fabric is printed with a paste prepared with

```
   40    parts of the dye of Example 1
  100    parts of urea
  380    parts of water
  450    parts of 4 percent sodium alginate thickening
   10    parts of sodium 1-nitrobenzene-3-sulphonate
   20    parts of anhydrous sodium carbonate
1,000    parts
```

The printed fabric is dried, steamed for 2 minutes at 100°–102°, rinsed with cold water, soaped at the boil for 15 minutes, rinsed again with warm water and dried. The resulting green-blue print exhibits excellent fastness to light and wet treatments.

Example of Application in Exhaustion Dyeing

Two parts of the dye of Example 1 are dissolved in 4,000 parts of cold water and the solution raised to 40°, on which two parts of 100 percent acetic acid and three parts of a mixture of a polyoxethylated fatty amine and an alkylpolyglycolether are added. Into this dyebath are entered 100 parts of a wool fabric. The bath is brought to the boil in 10–20 minutes and held at the boil for 45–60 minutes. Subsequently about three parts of 25 percent ammonia and three parts of hexamethylenetetramine tetramine are added at 85°–90° and treatment is continued for 20 minutes at 90°. The dyed fabric is rinsed thoroughly, with some acetic acid added to one change of rinsing water, and dried. A level green-blue dyeing is obtained which is fast to washing, perspiration, water and milling.

In the following table further metal complexes of formazane dyes conforming to the present invention are specified. In the metal-free form they have the general formula

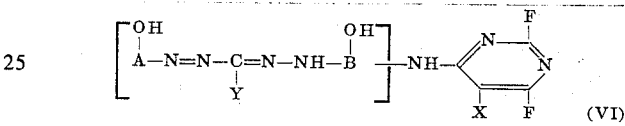

and in the table they are distinguished by the significance of the symbols

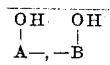

Y and X, by the metal used for complex formation and by the shade of the dyeing on cotton.

TABLE

| Ex. No. | $\overset{OH}{\underset{A}{|}}$ | $\overset{OH}{\underset{B}{|}}$ | Y | X | Metal | Shade on cotton |
|---|---|---|---|---|---|---|
| 2 | OH-C₆H₃(SO₃H)- | OH-C₆H₃(SO₃H)- | $-CON(C_2H_5)_2$ | Cl | Cu | Navy-blue. |
| 3 | Same as above | Same as above | Same as above | Br | Cu | Do. |
| 4 | do | do | do | H | Cu | Do. |
| 5 | OH, O₂N-, SO₃H substituted phenyl | do | $-CONH-C_6H_5$ | Cl | Cu | Do. |
| 6 | Same as above | do | Same as above | F | Cu | Do. |
| 7 | do | do | do | CH₃ | Cu | Do. |
| 8 | OH, HO₃S-, CH₃ substituted phenyl | do | $-CONH(CH_2)_3OCH_3$ | Cl | Cu | Do. |
| 9 | OH, Cl-, SO₃H substituted phenyl | do | $-CONHCH_2\overset{C_2H_5}{\underset{|}{CH}}-C_4H_9$ | Cl | Ni | Grey-violet. |

TABLE—Continued

| Ex. No. | OH \| A | OH \| B | Y | X | Metal | Shade on cotton |
|---|---|---|---|---|---|---|
| 10 | HO₃S–C₆H₂(OH)(NO₂)– | ...do... | –CONH–C₆H₃(COOH)(OH) | Cl | Cu | Grey-blue. |
| 11 | HO₃S–C₆H₂(OH)(SO₃H)– | HO–C₁₀H₅(SO₃H)– (naphthalene) | –CONHCH₂CH₂OH | Cl | Cu | Blue-green. |
| 12 | Same as above | Same as above | Same as above | H | Cu | Do. |
| 13 | HO–C₆H₃(SO₃H)– | HO–C₁₀H₅(SO₃H)– (naphthalene) | –CONH–C₆H₅ | Cl | Cu | Do. |
| 14 | HO₃S–C₆H₂(OH)(Cl)– | HO–C₆H₃(SO₃H)– | –CONHCH₂–C₆H₅ | Cl | Cu | Navy-blue. |
| 15 | HO₃S–C₆H₂(OH)(SO₃H)– | HO–C₆H₃(SO₃H)– | –CONHC₅H₁₁(n) | Cl | Cu | Do. |
| 16 | HOOC–C₆H₂(OH)(SO₃H)– | HO–C₆H₃(SO₃H)– | –CO–N(C₂H₄OH)(C₆H₅) | Cl | Cu | Do. |
| 17 | HO₃S–C₆H₂(OH)(SO₃H)– | HO–C₆H₃(SO₃H)– | –CO–N(morpholino) | Cl | Cu | Do. |
| 18 | HO–C₆H₃(SO₃H)– | Same as above | –CON(C₂H₄OH)₂ | Cl | Cu | Do. |
| 19 | HO–C₆H₃(SO₂CH₃)– | ...do... | –CONH–C₆H₄–SO₃H | H | Cu | Do. |

TABLE—Continued

| Ex. No. | A (OH) | B (OH) | Y | X | Metal | Shade on cotton |
|---|---|---|---|---|---|---|
| 20 | 2,4-disulfo-phenol (HO3S at 3 and 5 positions) with OH | 4-chloro-phenol with OH | —CONH—C6H4—SO2NH2 | Cl | Cu | Grey-blue. |
| 21 | 3-sulfo-5-chloro-phenol with OH | 3-sulfo-phenol with OH | —CONH—C6H4(OCH3) | Cl | Cu | Do. |
| 22 | 4-(SO2NHCH3)-phenol with OH | Same as above | —CONH—C6H3(Cl)(SO3H) | Cl | Cu | Grey-violet. |
| 23 | 4-chloro-phenol with OH | 2-chloro-phenol with OH | —CONH—C6H3(SO3H)2 | Cl | Cu | Blue. |
| 24 | 4-SO3H-phenol with OH | 4-SO2N(C2H5)2-phenol with OH | —CONH—naphthyl—SO3H | Cl | Cu | Blue-violet. |
| 25 | Same as above | Same as above | Same as above | F | Cu | Do. |
| 26 | phenol with OH | 4-SO3H-phenol with OH | —CONH—naphthyl(SO3H)2 | Cl | Cu | Do. |
| 27 | 4-(SO2NH-C6H5)-phenol with OH | 4-NO2-phenol with OH | —CONH—naphthyl(SO3H)2 | Cl | Cu | Do. |
| 28 | 3-sulfo-5-HO3S-phenol with OH | 4-SO3H-phenol with OH | —CONH—C6H4—SO2NH—C6H5 | Br | Cu | Navy-blue. |
| 29 | Same as above | Same as above | Same as above | Cl | Cu | Do. |
| 30 | 3-HO3S-phenol with OH | do | —CONH—naphthyl—SO2NHCH2CH2OH | Cl | Cu | Do. |

TABLE—Continued

| Ex. No. | OH \| A | OH \| B | Y | X | Metal | Shade on cotton |
|---|---|---|---|---|---|---|
| 31 | HO₃S—[naphthalene-OH] | [naphthalene-OH]—SO₃H | —CON(C₅H₁₀)(cyclic with H) | Cl | Cu | Green. |
| 32 | HO₃S—[phenyl-OH]-SO₃H | [phenyl-OH]—SO₃H / SO₃H | —CONH—[phenyl]—I | Cl | Cu | Navy-blue. |
| 33 | OH / [phenyl] / C₅H₁₁ | Same as above | —CONH—[phenyl] | Cl | Cu | Grey-blue. |
| 34 | OH / [phenyl] / CH₃ | OH—[naphthyl]—SO₃H / NO₂ | —CONH—[phenyl]—SO₃H | Cl | Cu | Olive-grey. |
| 35 | CH₃CO—HN—[phenyl-OH]—SO₃H | [phenyl-OH]—Cl / SO₃H | —CONH—[phenyl]—I / CH₃ | Cl | Cu | Navy blue. |
| 36 | OH / [phenyl] / SO₂NH₂ | OH / [phenyl] / SO₂NH₂ | —CO—NH—[naphthyl]—SO₃H / SO₃H | Cl | Cu | Grey-violet. |
| 37 | HO₃S—[phenyl-OH] / CH₃ | [phenyl-OH]—SO₃H | H | Cl | Cu | Navy-blue. |
| 38 | HO₃S—[phenyl-OH]—SO₃H | Same as above | H | F | Ni | Violet-brown. |
| 39 | Same as above | do | H | Cl | Cu | Navy-blue. |
| 40 | HO₃S—[phenyl-OH] | [phenyl-OH]—SO₃H / NO₂ | —CO—NHC₄H₉ | Cl | Cu | Do. |

| Ex. No. | OH \| A | OH \| B | Y | X | Metal | Shade on cotton |
|---|---|---|---|---|---|---|
| 41 | (phenol, OH) | OH, SO₃H, SO₃H (phenol disulfonic) | H | Cl | Cu | Grey-blue. |
| 42 | OH, HO₃S-, SO₃H | OH, SO₃H | —CONH—⌬ | Cl | Cu | Navy-blue. |
| 43 | OH, C₂H₅O- | OH, SO₃H, SO₃H | —CONH—⌬—SO₃H | Cl | Cu | Grey-blue. |
| 44 | OH, Br | OH, SO₃H | —CO—NH—⌬(SO₃H)(SO₂—NH₂) | Cl | Ni | Grey-violet. |
| 45 | OH, HO₃S-, SO₃H | OH, CH₃—C(CH₃)—CH₃ | —CO—N(—CH₂—CH=CH₂)—⌬—SO₃H | Cl | Cu | Navy-blue. |
| 46 | Same as above | OH, SO₃H | —CONH—CH(—CH₂—CH(CH₃)₂)—COOH | Cl | Cu | Do. |
| 47 | do | Same as above | —CONH—CH₂—CH₂—(imidazolidinone) | Cl | Cu | Do. |
| 48 | do | do | —CONH—CH₂—CH₂—(imidazole) | Cl | Cu | Do. |
| 49 | do | do | —CONH—CH₂—(furan) | Cl | Cu | Do. |
| 50 | do | do | —CONH—CH₂—(tetrahydrothiophene SO₂) | Cl | Cu | Do. |
| 51 | do | do | —CON(—CH₂CH₂OH)(—CH₂—(furan)) | Cl | Cu | Do. |

TABLE—Continued

| Ex. No. | OH A | OH B | Y | X | Metal | Shade on cotton |
|---|---|---|---|---|---|---|
| 52 | do | do | —CONH—(CH$_2$)$_3$—O—CH(CH$_3$)$_2$ | Cl | Cu | Do. |
| 53 | do | do | —CONH—C(CH$_3$)$_3$ | Cl | Cu | Do. |
| 54 | do | do | —CONH—⟨C$_6$H$_4$⟩—C(CH$_3$)$_3$ | Cl | Cu | Do. |
| 55 | do | do | —CON(—CH$_2$—C$_6$H$_5$)(—CH$_2$COCH) | Cl | Cu | Do. |
| 56 | do | do | —CON⟨pyrrolidine⟩ | Cl | Cu | Do. |
| 57 | do | do | —CON⟨hexamethyleneimine⟩ | Cl | Cu | Do. |
| 58 | OH—⟨C$_6$H$_3$⟩—SO$_3$H | OH—⟨C$_6$H$_3$⟩—SO$_2$—CH(CH$_3$)$_2$ | —CON(CH$_3$)—⟨C$_6$H$_4$⟩—SO$_3$H | Cl | Cu | Blue-violet. |
| 59 | Same as above | OH—⟨C$_6$H$_2$⟩(NHCO—O—C$_2$H$_5$)(SO$_3$H) | —CONH—⟨C$_6$H$_3$⟩(CH$_3$)(Cl) | Cl | Cu | Navy-blue. |
| 60 | do | OH—⟨C$_6$H$_3$⟩—SO$_2$—NH—⟨C$_6$H$_4$⟩—SO$_3$H | —CONH—CH$_2$—CH$_2$—O—SO$_3$H | Cl | Cu | Blue-violet. |
| 61 | OH—⟨C$_6$H$_3$⟩(CH$_3$)—SO$_3$H | OH—⟨C$_6$H$_3$⟩(CH$_3$)—SO$_3$H | —CONHCH$_3$ | Cl | Cu | Navy-blue. |
| 62 | Same as above | Same as above | —CONHC$_2$H$_5$ | Cl | Cu | Do. |
| 63 | do | do | —CON(CH$_3$)$_2$ | Cl | Cu | Do. |
| 64 | do | do | —CONHCH$_2$CH$_2$OCH$_3$ | Cl | Cu | Do. |
| 65 | do | do | —CONHCH$_2$CHCH$_3$—OH | Cl | Cu | Do. |
| 66 | do | do | —CON(CH$_2$CHCH$_3$)$_2$—OH | Cl | Cu | Do. |
| 67 | do | do | —CON(CH$_3$)CH$_2$CH$_2$OH | Cl | Cu | Do. |
| 68 | do | do | —CONHCH$_2$COOH | Cl | Cu | Do. |
| 69 | do | do | —CON(CH$_3$)CH$_2$COOH | Cl | Cu | Do. |

TABLE—Continued

| Ex. No. | A (OH) | B (OH) | Y | X | Metal | Shade on cotton |
|---|---|---|---|---|---|---|
| 70 | HO₃S—⌬(OH)—SO₃H | do | —CON(C₄H₉n)₂ | Cl | Cu | Do. |
| 71 | Same as above | do | —CONH—⌬—CF₃ | Cl | Cu | Do. |
| 72 | do | do | —CON(CH₃)—⌬—OC₂H₅ | Cl | Cu | Do. |
| 73 | do | do | —CONH—⌬(H)—CH₃ | Cl | Cu | Do. |
| 74 | do | do | —CON(CH₂—CH(OH)—CH₃)—⌬(H) | Cl | Cu | Do. |
| 75 | do | do | —CON(⌬H)—CH₂CH(OH)—⌬ | Cl | Cu | Do. |
| 76 | do | do | —CON(CH₂CH₂COOH)—⌬(H) | Cl | Cu | Do. |
| 77 | do | do | —CONH—⌬(H)—OH | Cl | Cu | Do. |
| 78 | do | do | —CONHC₁₀H₂₁ | Cl | Cu | Do. |
| 79 | do | do | —CONHCH(CH₂)₁₀CH₂ | Cl | Cu | Do. |
| 80 | do | do | —CONH(CH₂)₄—⌬(H) | Cl | Cu | Do. |
| 81 | do | do | —CONHCH(CH₂)₆CH₂ | Cl | Cu | Do. |
| 82 | do | do | —CONHCHCOOH<br>(CH₂)₂COOH | Cl | Cu | Do. |
| 83 | do | do | —CON—⌬(H)—COOH | Cl | Cu | Do. |
| 84 | do | do | —CON—⌬(H)—C₃H₇ | Cl | Cu | Do. |
| 85 | do | do | —CO—N(CH₃)—⌬ | Cl | Cu | Do. |
| 86 | do | do | —CO—NH—⌬—Br | Cl | Cu | Do. |
| 87 | do | do | —CO—NH—⌬—CH₃ | Cl | Cu | Do. |
| 88 | do | do | —CO—NH—⌬—Cl | Cl | Cu | Do. |
| 89 | do | do | —CO—N(C₂H₅)—⌬ | Cl | Cu | Do. |

TABLE—Continued

| Ex. No. | OH ↓ A | OH ↓ B | Y | X | Metal | Shade on cotton |
|---|---|---|---|---|---|---|
| 90 | ![structure with OH, SO3H on naphthalene] | HO3S—[ring with OH, SO3H] | —CO—NH—[ring with 2 CH3] | Cl | Cu | Do. |
| 91 | Same as above | Same as above | —CO—NH—[ring with CH3, CH3] | Cl | Cu | Do. |
| 92 | do | HO3S—[ring with OH, CH3] | —CO—NH—C2H4—SO3H | Cl | Cu | Do. |
| 93 | do | Same as above | —CO—N(CH3)—C2H4—SO3H | Cl | Cu | Do. | formulas of representative dyes of the foregoing Examples are as follows:

Example 1

The copper complex compound of the formula

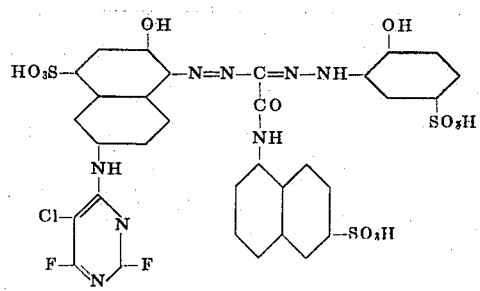

Example 2

The copper complex compound of the formula

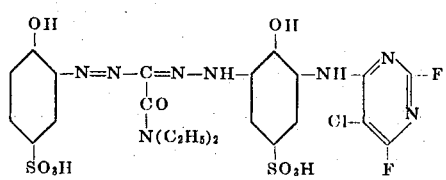

Example 8

The copper complex compound of the formula

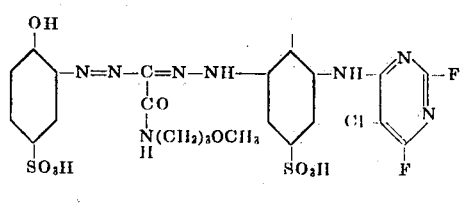

Example 18

The copper complex compound of the formula

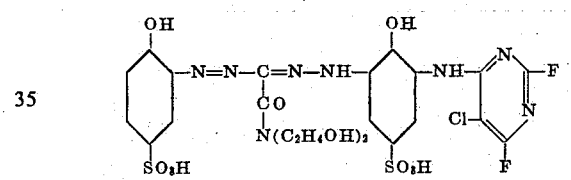

Example 37

The copper complex compound of the formula

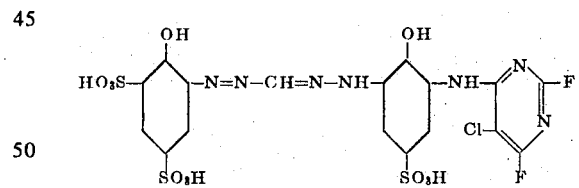

Example 42

The copper complex compound of the formula

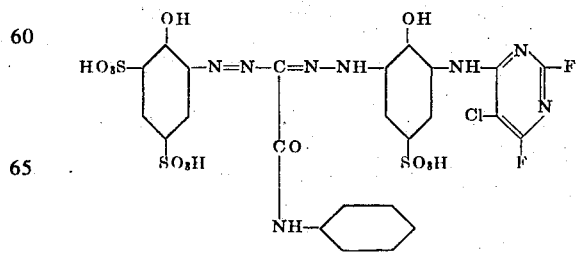

We claim:
1. A complex of copper and a compound of the formula

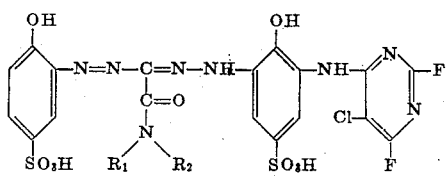

wherein

is N,N-diethylamino, N-3-methoxypropylamino, N,N-di-(2-hydroxyethyl)amino or N-phenylamino.

2. The complex, according to claim 1, of copper and a compound of formula

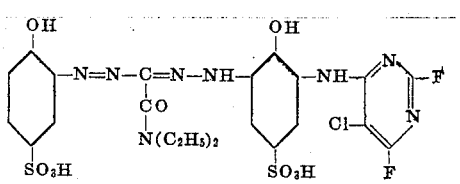

3. The complex, according to claim 1, of copper and a compound of formula

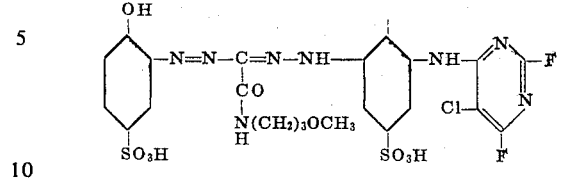

4. The complex according to claim 1, of copper and a compound of formula

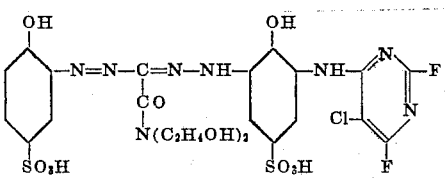

5. The complex according to claim 1, of copper and a compound of formula

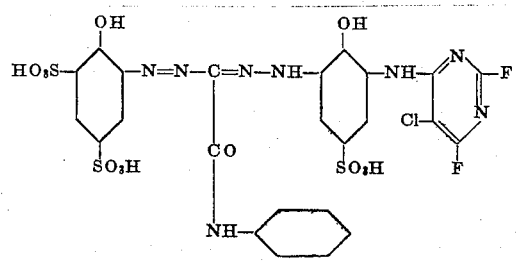

* * * * *

UNITED STATES PATENT OFFICE
CERTIFICATE OF CORRECTION

Patent No. 3,725,382   Dated April 3, 1973

Inventor(s) Philippe Grandjean

It is certified that error appears in the above-identified patent and said Letters Patent are hereby corrected as shown below:

Column 2 line 16, add -- $SO_2NHC_2H_4OH$ -- after .... $CH_3$

Column 2 line 19 delete "$SO_2NHC_2H_4OCH_5$" ..

Column 2 line 37 delete "alkylene" and insert therefor --alkenyl--.

Column 2 line 63 delete

" 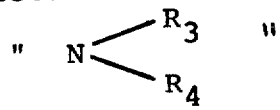 "

and insert therefor

-- 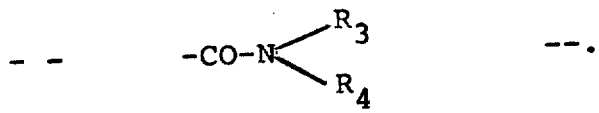 --.

UNITED STATES PATENT OFFICE
CERTIFICATE OF CORRECTION

Patent No. 3,725,382    Dated April 3, 1973

Inventor(s) Philippe Grandjean    PAGE - 2

It is certified that error appears in the above-identified patent and that said Letters Patent are hereby corrected as shown below:

Column 2 line 67, delete

"    "

and insert therefor

--  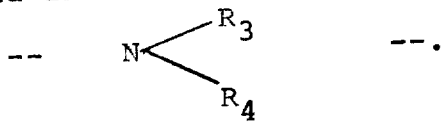  --.

Column 3 line 7, delete the "," after 1-hydroxybutyl-2- and insert therefor -- and --.

Column 3 line 9, delete the "," after hydroxyethyl)- and insert therefor --and--.

Column 4 line 10, delete "30°" and insert therefor --20°--.

Column 5 line 1, delete "food" and insert therefor --good--.

UNITED STATES PATENT OFFICE
CERTIFICATE OF CORRECTION

Patent No. 3,725,382      Dated April 3, 1973

PAGE - 3

Inventor(s) Philippe Grandjean

It is certified that error appears in the above-identified patent and said Letters Patent are hereby corrected as shown below:

Column 7 line 2, delete "liquid" and insert therefor --liquor--.

Column 8 line 12 delete the word "tetramine".

Column 7-8 , example 8, A column, delete

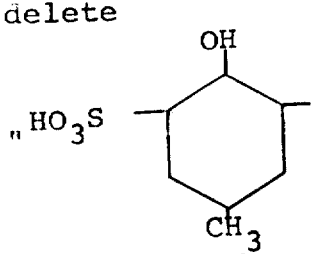

and insert therefor

-- 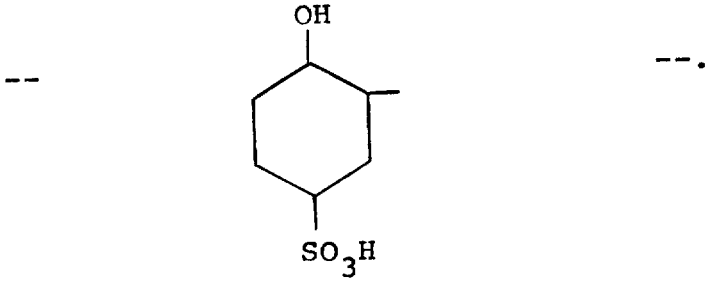 --.

UNITED STATES PATENT OFFICE
CERTIFICATE OF CORRECTION

Patent No. 3,725,382   Dated April 3, 1973

Inventor(s) Philippe Grandjean   PAGE - 4

It is certified that error appears in the above-identified patent and that said Letters Patent are hereby corrected as shown below:

Column 9-10, example 11, B column, delete " 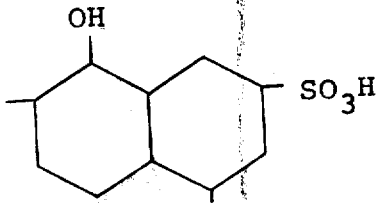 "

and insert therefor

-- 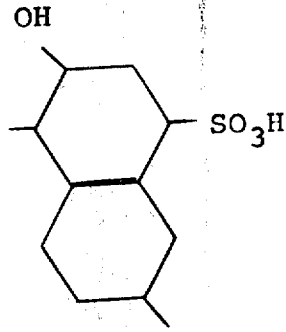 --.

UNITED STATES PATENT OFFICE
CERTIFICATE OF CORRECTION

Patent No. 3,725,382  Dated April 3, 1973

PAGE - 5

Inventor(s) Philippe Grandjean

It is certified that error appears in the above-identified patent and that said Letters Patent are hereby corrected as shown below:

Column 9-10, example 13, B column, delete " 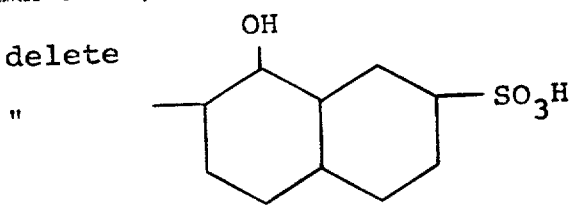 "

and insert -- 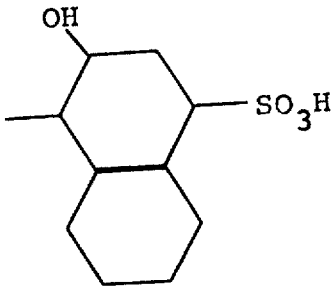 --.

UNITED STATES PATENT OFFICE
CERTIFICATE OF CORRECTION

Patent No. 3,725,382          Dated April 3, 1973

PAGE - 6

Inventor(s) Philippe Grandjean

It is certified that error appears in the above-identified patent and that said Letters Patent are hereby corrected as shown below:

Column 11-12, example 24, B column, delete "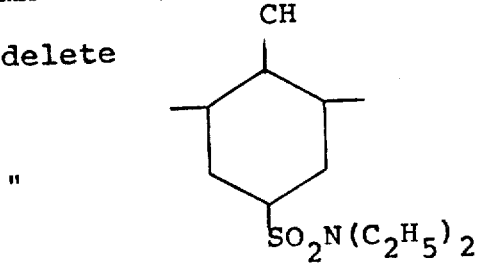"

and insert therefor

--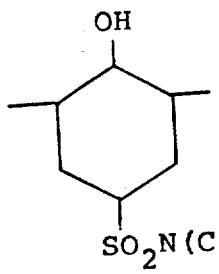--.

Column 11, example 27, shade on cotton column, delete "Do." and insert therefor --grey-blue--.

Column 22, line 41 delete "37" and insert therefor --39--.

UNITED STATES PATENT OFFICE
CERTIFICATE OF CORRECTION

Patent No. 3,725,382                         Dated April 3, 1973

PAGE - 7

Inventor(s)  Philippe Grandjean

It is certified that error appears in the above-identified patent and that said Letters Patent are hereby corrected as shown below:

Column 23, line 14, claim 1, insert

-- or the compound of the formula

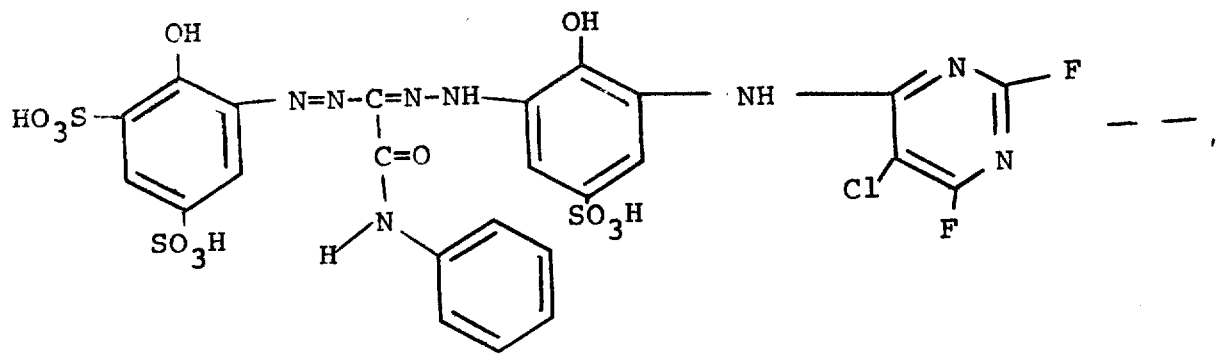

-- ,

Column 23, line 22, delete the "," after "methoxypropylamino" and insert therefor  --or--.

Column 23, line 23, delete "or N-phenylamino"

Column 23, line 25 insert the word  --the-- after  ...a compound of .

UNITED STATES PATENT OFFICE
CERTIFICATE OF CORRECTION

Patent No. 3,725,382　　　　　　　Dated April 3, 1973

Inventor(s) Philippe Grandjean　　　　　　　PAGE - 8

It is certified that error appears in the above-identified patent and that said Letters Patent are hereby corrected as shown below:

Column 24, line 2 insert the word --the-- after ...a compound of.

Column 24, line 5 delete

" 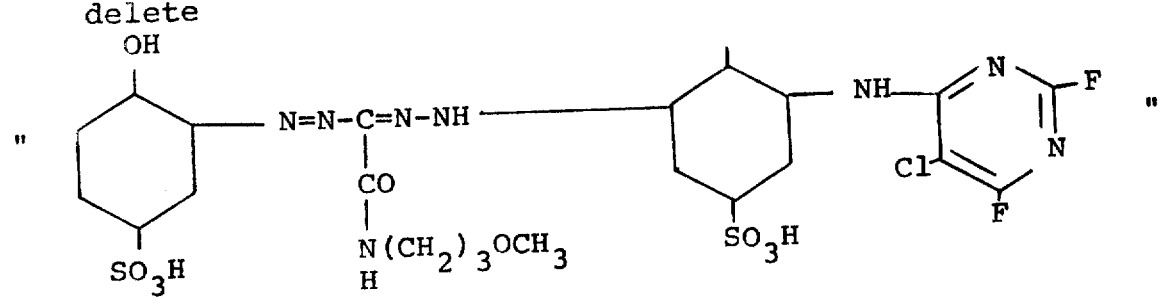 "

and insert therefor

-- 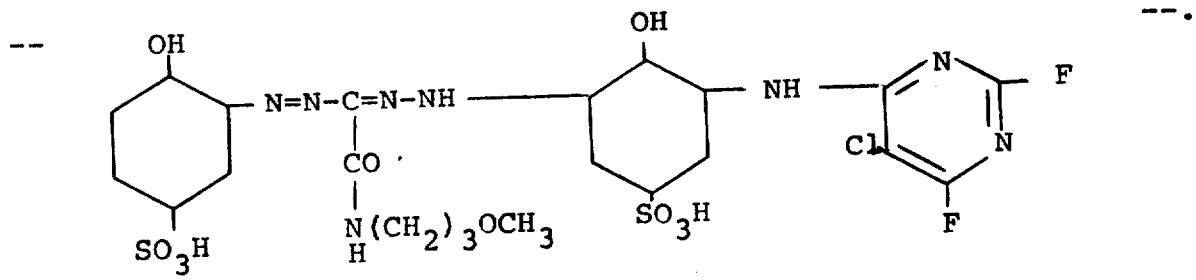 --.

UNITED STATES PATENT OFFICE
CERTIFICATE OF CORRECTION

Patent No. 3,725,382      Dated April 3, 1973

Inventor(s)    Philippe Grandjean      PAGE - 9

It is certified that error appears in the above-identified patent and that said Letters Patent are hereby corrected as shown below:

Column 24, line 12, insert the word --the-- after   .......a compound of .

Column 24, line 22, insert the word --the-- after   .......a compound of .

Signed and sealed this 1st day of January 1974.

(SEAL)
Attest:

EDWARD M. FLETCHER, JR.      RENE D. TEGTMEYER
Attesting Officer      Acting Commissioner of Patents